United States Patent [19]

Giamati

[11] Patent Number: 5,657,951

[45] Date of Patent: Aug. 19, 1997

[54] ELECTROTHERMAL DE-ICING SYSTEM

[75] Inventor: Michael J. Giamati, Akron, Ohio

[73] Assignee: The B.F. Goodrich Company, Akron, Ohio

[21] Appl. No.: 494,268

[22] Filed: Jun. 23, 1995

[51] Int. Cl.$^6$ .......................... B64D 15/00; B64D 14/14
[52] U.S. Cl. .................. 244/134 D; 244/134 E; 219/121.66
[58] Field of Search ............. 244/134 R, 134 D, 244/134 E; 219/121.65, 121.66, 202

[56] References Cited

U.S. PATENT DOCUMENTS

| | | | |
|---|---|---|---|
| 2,496,279 | 2/1950 | Ely et al. | 244/134 D |
| 2,757,273 | 7/1956 | Taylor | 244/134 D |
| 2,762,897 | 9/1956 | Vrooman et al. | 219/20 |
| 2,992,317 | 7/1961 | Hoffman | 219/46 |
| 3,002,718 | 10/1961 | Hackenberger, Jr. | 244/134 R |
| 3,013,752 | 12/1961 | Rush | 244/134 R |
| 3,022,412 | 2/1962 | Waters | 219/46 |
| 3,204,084 | 8/1965 | Spencer, Jr. et al. | 219/202 |
| 3,420,476 | 1/1969 | Volkner et al. | 244/134 R |
| 4,036,457 | 7/1977 | Volkner et al. | 244/134 D |
| 4,638,960 | 1/1987 | Straube et al. | 244/134 D |
| 5,351,918 | 10/1994 | Giamati et al. | 244/134 D |
| 5,475,204 | 12/1995 | Giamati et al. | 244/134 R |

FOREIGN PATENT DOCUMENTS 0459216  12/1991  European Pat. Off. ........... 244/134 D

*Primary Examiner*—Andres Kashnikow
*Assistant Examiner*—Virna Lissi Mojica
*Attorney, Agent, or Firm*—Kevin L. Leffel

[57] ABSTRACT

A de-icing system is provided including a de-icer attached to an aircraft structural member subjected to an impinging airstream during flight, the airstream passing over the structural member in a fore to aft direction. The deicer has a primary heater element disposed beneath a primary shedding zone upon which ice accumulates during flight, the primary heater element being configured to heat the primary shedding zone upon application of an electrical potential across the primary heater element, and a secondary heater element disposed beneath a secondary shedding zone upon which ice accumulates during flight, the secondary heater element being configured to heat the secondary shedding zone upon application of an electrical potential across the secondary heater element, the secondary heater element being disposed immediately aft of the primary heater element. The de-icing system also has a controller configured to heat the primary heating element for a period of time sufficient to induce ice to shed from the primary shedding zone, to subsequently allow the primary heating element to cool below freezing, and to subsequently heat the secondary heating element for a period of time sufficient to induce ice to shed from the secondary shedding zone. The invention reduces runback and refreeze in unheated areas.

20 Claims, 7 Drawing Sheets

ELECTROTHERMAL DE-ICING SYSTEM

TECHNICAL FIELD

This invention relates to electrothermal deicing systems, and more particularly, to an electrothermal deicing system which controls heater on and off time to minimize runback and refreeze.

BACKGROUND ART

The accumulation of ice on aircraft wings and other structural members in flight is a danger that is well known. As used herein, the term "structural members" is intended to refer to any aircraft surface susceptible to icing during flight, including wings, stabilizers, engine inlets, rotors, and so forth. Attempts have been made since the earliest days of flight to overcome the problem of ice accumulation. While a variety of techniques have been proposed for removing ice from aircraft during flight, these techniques have had various drawbacks that have stimulated continued research activities.

One approach that has been used is thermal deicing. In thermal deicing, the leading edges, that is, the portions of the aircraft that meet and break the airstream impinging on the aircraft, are heated to prevent the formation of ice or to loosen accumulated ice. The loosened ice is removed from the structural members by the airstream passing over the aircraft.

In one form of thermal deicing, heating is accomplished by placing an electrothermal de-icer, including heating elements, over the leading edges of the aircraft, or by incorporating the heating elements into the structural members of the aircraft. Electrical energy for each heating element is derived from a generating source driven by one or more of the aircraft engines or auxiliary power unit (APU). The electrical energy is intermittently or continuously supplied to provide heat sufficient to prevent the formation of ice or to loosen accumulating ice.

With some commonly employed thermal deicers, the heating elements are configured as ribbons, i.e. interconnected conductive segments, that are mounted on a flexible backing. The conductive segments are separated from each other by gaps, i.e. intersegmental gaps, and each ribbon is electrically energized by a pair of contact strips. When applied to a wing or other airfoil surface, the segments are arranged in strips or zones extending spanwise or chordwise of the aircraft wing or airfoil. One of these strips, known as a spanwise parting strip, is disposed along a spanwise axis which commonly coincides with a stagnation line that develops during flight in which icing is encountered. Other strips, known as chordwise parting strips, are disposed at the ends of the spanwise parting strip and are aligned along chordwise axes. Other zones, known as spanwise shedding zones, typically are positioned above and below the spanwise parting strip at a location intermediate the chordwise parting strips. Between adjacent zones, a gap, known as an interheater gap, exists.

One of the draw-backs of electrothermal deicers as thus described is that excessive heat is typically supplied and/or stored in the heating elements so that as ice present at leading edge surfaces becomes completely melted, a flow of water forms back over unheated surfaces, often resulting in renewed and uncontrollable ice formation. This condition is commonly known as runback and refreeze.

This drawback is avoided by heating the electrical resistance heaters in succession only for short periods, thereby melting only the adhesion layer between the ice and the aircraft surface so that the ice pieces are removed by aerodynamic forces occurring during flight.

A deicing system operating in this manner is disclosed in U.S. Pat. No. 3,420,476, issued to Volkner et al. In this patent, two groups of deicer heating elements are provided in an aircraft, one group being energized continuously when the deicer is operating, and the other group being energized periodically for short periods of time by a pulse generator. A temperature transducer is mounted adjacent to one of the continuously energized heating elements, and the time period during which the periodically energized heating elements are energized is varied in accordance with the output of the temperature transducer to thereby regulate the temperature of the heating elements in accordance with environmental conditions and to prevent the heating elements from becoming overheated. This is done by energizing the periodically energized heating elements in sequence at predetermined fixed times with a first pulse generator, and de-energizing the heating elements with a second pulse generator which is coupled to the temperature transducer and which varies the time of de-energization in accordance with the output of that transducer.

Another deicing system operating in accordance with these principals is disclosed in U.S. Pat. No. 4,036,457 to Volkner et al. which discloses a plurality of electrical resistance heaters which are sequentially operated, the duration of the heating periods in dependence on the temperature at the resistance heaters, and the duration of the non-heating periods being dependant on the water content of the atmosphere surrounding the aircraft.

The Volkner patents describe expensive and complicated systems. An improved thermal deicer which minimizes runback and refreeze without increasing complexity is therefore highly desirable.

SUMMARY OF THE INVENTION

According to an aspect of the invention, a de-icing system is provided including a de-icer attached to an aircraft structural member subjected to an impinging airstream during flight, said airstream passing over said structural member in a fore to aft direction, comprising:

a primary heater element disposed beneath a primary shedding zone upon which ice accumulates during flight, said primary heater element being configured to heat said primary shedding zone upon application of an electrical potential across said primary heater element;

a secondary heater element disposed beneath a secondary shedding zone upon which ice accumulates during flight, said secondary heater element being configured to heat said secondary shedding zone upon application of an electrical potential across said secondary heater element, said secondary heater element being disposed immediately aft of said primary heater element; and, a controller configured to heat said primary heating element for a period of time sufficient to induce ice to shed from said primary shedding zone, to subsequently allow said primary heating element to cool below freezing, and to subsequently heat said secondary heating element for a period of time sufficient to induce ice to shed from said secondary shedding zone.

According to another aspect of the invention, a method is provided for de-icing an aircraft structural member subjected to an impinging airstream during flight, the airstream passing over the structural member in a fore to aft direction, comprising the steps of:

heating a primary heating element disposed beneath a primary shedding zone upon which ice accumulates during flight, the primary heating element being heated for a period of time sufficient to induce ice to shed from the primary shedding zone by applying an electrical potential across the primary heater element;

subsequently allowing the primary heating element to cool below freezing; and, subsequently heating a secondary heating element disposed beneath a secondary shedding zone upon which ice accumulates during flight, the secondary heating element being heated for a period of time sufficient to induce ice to shed from the secondary shedding zone by applying an electrical potential across the secondary heater element, the secondary heater element being disposed immediately aft of the primary heater element.

The present invention provides precise control of ice shedding which helps prevent the formation of runback ice. By turning primary shed zones off for a specific required amount of time to allow ice to reaccumulate, sequential zones can be deiced without runback ice forming. In addition, the present invention is compatible with prior electrothermal deicer manufacturing techniques can be adapted to existing electrothermal de-icers.

These and other objects, features, and advantages of the present invention will become more apparent in the light of the detailed description of exemplary embodiments thereof, as illustrated by the drawings.

DETAILED DESCRIPTION

Figure 1:
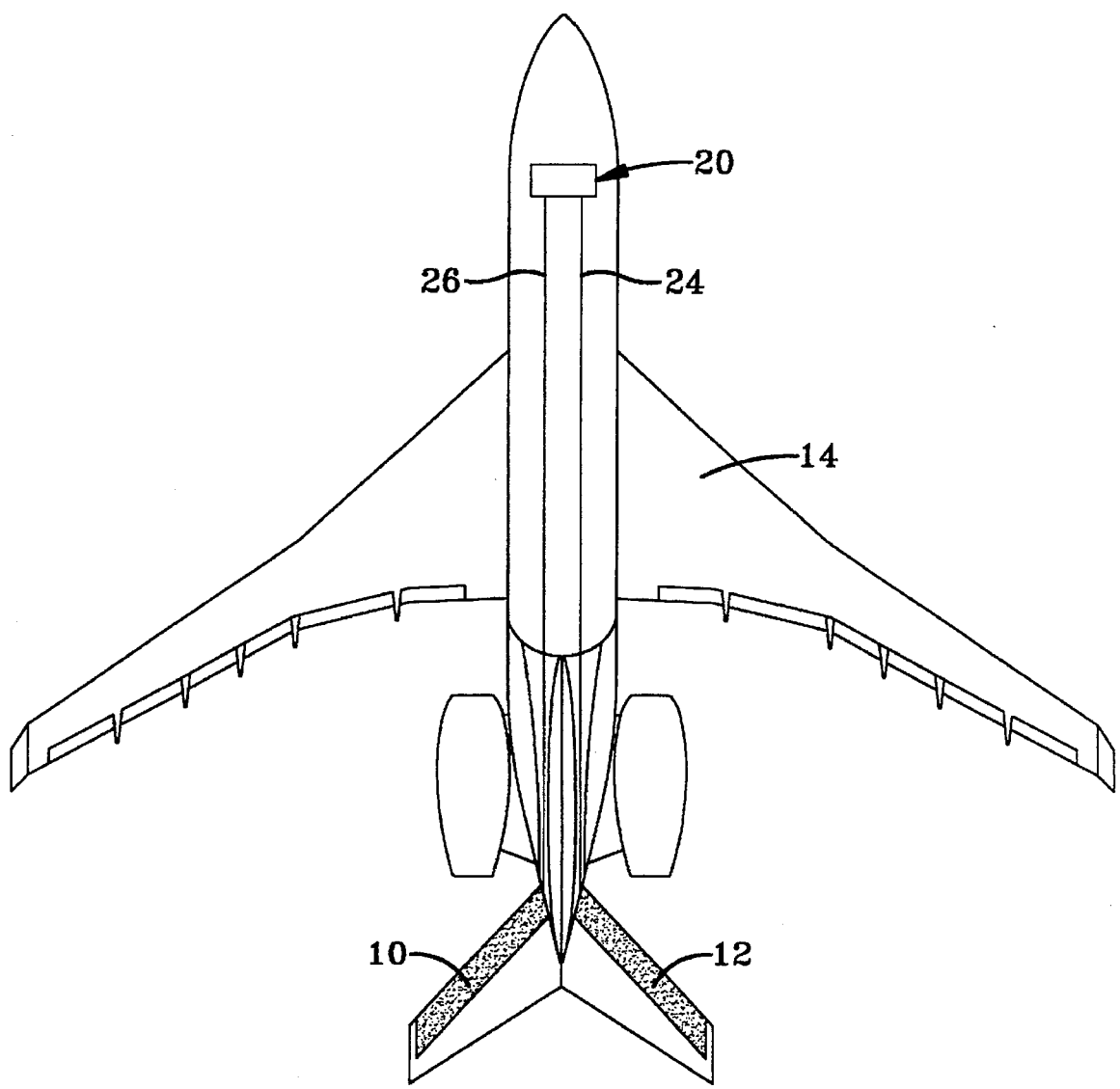
FIG. 1 is a schematic top view representation of a de-icing system in accordance with an aspect of the present invention mounted on an aircraft.

Referring now to FIG. 1, electrothermal de-icers 10, 12 having heater elements provided therein are disposed on the horizontal stabilizers of an aircraft 14. Ice accumulates on the horizontal stabilizers during flight in atmospheric icing conditions, and electrical power is applied to the heater elements of electrothermal de-icers 10, 12 in a controlled manner in order to remove accumulated ice. De-icers 10, 12 are controlled by a controller 20 via control lines 24, 26, which carry temperature input from heaters 10, 12 to controller 20, and control signal and power outputs from controller 20 to de-icers 10, 12 in response thereto. Alternatively, the de-icers may be disposed beneath the aircraft skin, embodiments of which will be described in greater detail hereinafter.

Figure 2:
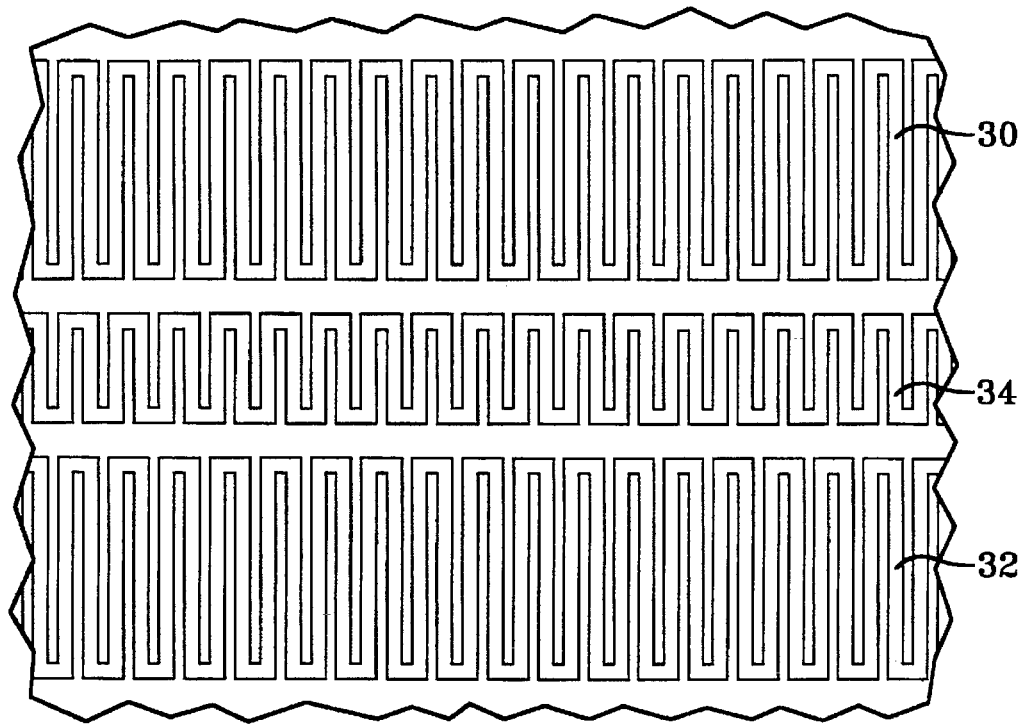
FIG. 2 is a top, cut away view of an electrothermal deicer in accordance with an aspect of the present invention.

Referring now to FIG. 2, an electrothermal de-icer in accordance with the present invention includes a plurality of heater elements 30 and 32, and at least one parting strip heating element 34. The heater elements 30, 32, and 34 convert electrical energy to heat energy through resistive heating upon application of an electrical potential to the heating elements, as is well knwon in the art. The controller 20 controls application of the electrical potential to the heater elements via control lines 24 and 26 in a manner that will be described. The heater elements and deicing pads utilized may be any of a number of assemblies well known in the art, such as those described in commonly owned U.S. patent application Ser. No. 08/063,367 entitled "Electrical Heater De-icer", now U.S. Pat. No. 5,475,204, filed May 1, 1993 which is hereby incorporated herein by reference. The heater elements may be comprised of conductive strips, ribbons, or other structures for generating heat through resistance heating. The heat power density (watts/square inch) for a ribbon or wire heating element may be established by choosing a material having appropriate resistance characteristics, and by varying width, thickness, and inter-heater gap width. The heating elements are preferably formed from metal. The principals of heating element design and construction for aircraft de-icers are well known in the art.

Figure 3:
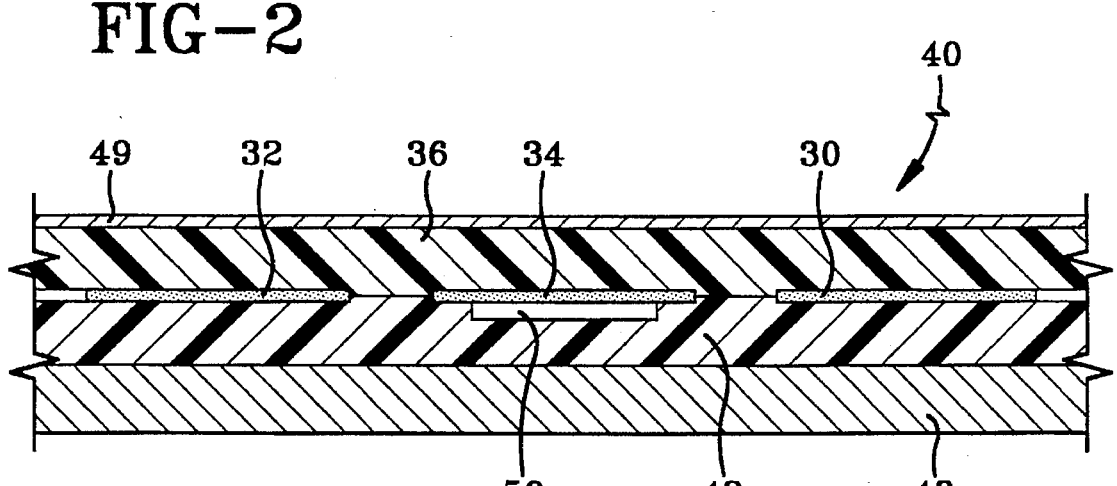
FIG. 3 is an enlarged, fragmentary cross-sectional view of an externally mounted electrothermal deicer in accordance with an aspect of the present invention.

Referring now to FIG. 3, an electrothermal de-icer according to an aspect of the present invention for installation on top of an structural member includes an outer electrical insulating layer 36, a plurality of heating elements 30, 32 and 34, and an inner electrical insulating layer 42. The inner and outer insulating layers 42 and 36 may be formed from elastomeric or plastic materials, but are preferably formed from a fiber reinforced plastic, such as fiberglass or polyester fiber reinforced epoxy. Suitable materials are well known in the art. An erosion layer 49 may be disposed over the outer insulating layer 36 in order to increase resistance to erosion from particulate and rain impact during taxi and flight. The erosion layer 48 may be comprised of any of a number of materials well known in the art, such as aluminum, stainless steel, titanium, polyurethane, or polyetheretherketone (PEEK). The electrothermal de-icer 40 is disposed over a structural member 48, which may be formed from metal, such as aluminum, or from a fiber reinforced plastic, such as fiberglass reinforced epoxy. Many materials are known in the art for forming structural members, any of which are considered to fall within the purview of the invention. The electrothermal de-icer 40 may be bonded to the structural member 48. A temperature sensor or transducer 50 is disposed adjacent the parting strip heating element 34, which can be used for temperature control of the parting strip zone. Each parting strip may have at least one temperature sensor 50. According to a preferred embodiment, back-up temperature sensors are included to provide redundancy. The temperature sensor 50 is preferably a thin film resistive wire grid sensor (RTD), such as those available from RDF Inc. (model 24777), Minco, Tayco, etc., that changes resistance in response to changes in temperature. The various elements of the electrothermal de-icer 40 are preferably bonded together under heat and pressure as a unitary structure, which may include the structural member 48.

Figure 4:
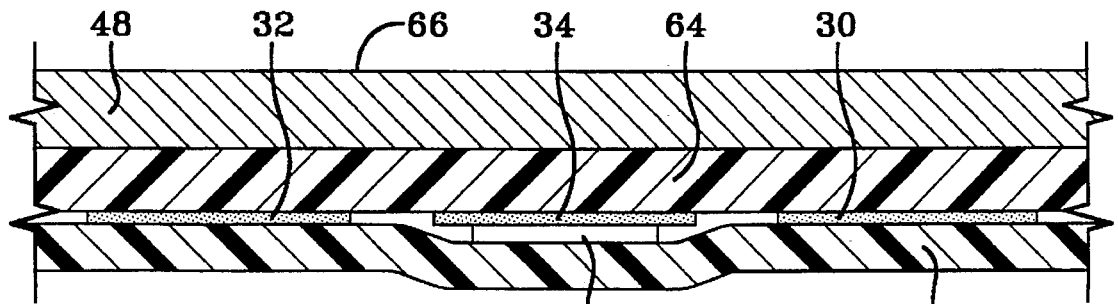
FIG. 4 is an enlarged, fragmentary cross-sectional view of an internally mounted electrothermal deicer in accordance with an aspect of the present invention.

Referring now to FIG. 4, an electrothermal de-icer according to an aspect of the present invention for installation inside a structural member includes an outer electrical insulating layer 64, a plurality of heating elements 30, 32 and 34, and an inner electrical insulating layer 62. The inner and outer insulating layers 62 and 64 may be formed from elastomeric or plastic materials, but are preferably formed from a fiber reinforced plastic, such as fiberglass or polyester fiber reinforced epoxy. Suitable materials are well known in the art. The structural member 48 defines an exposed surface 66 upon which ice accumulates during flight in icing conditions.

The electrothermal de-icer 60 is disposed beneath a structural member 48, which may be formed from metal, such as aluminum, or from a fiber reinforced plastic, such as fiberglass reinforced epoxy. Many materials are known in the art for forming structural members, any of which are considered to fall within the purview of the invention. This arrangement is particularly advantageous since the structural member covers and protects the de-icer 60 from damage. The electrothermal de-icer 60 may be bonded to the structural member 48. A temperature sensor or transducer 50 is disposed adjacent the parting strip heating element 34, which can be used for temperature control of the parting strip zone. The various elements of the electrothermal de-icer 60 are preferably bonded together under heat and pressure as a unitary structure, which may include the structural member 48.

Figure 5:
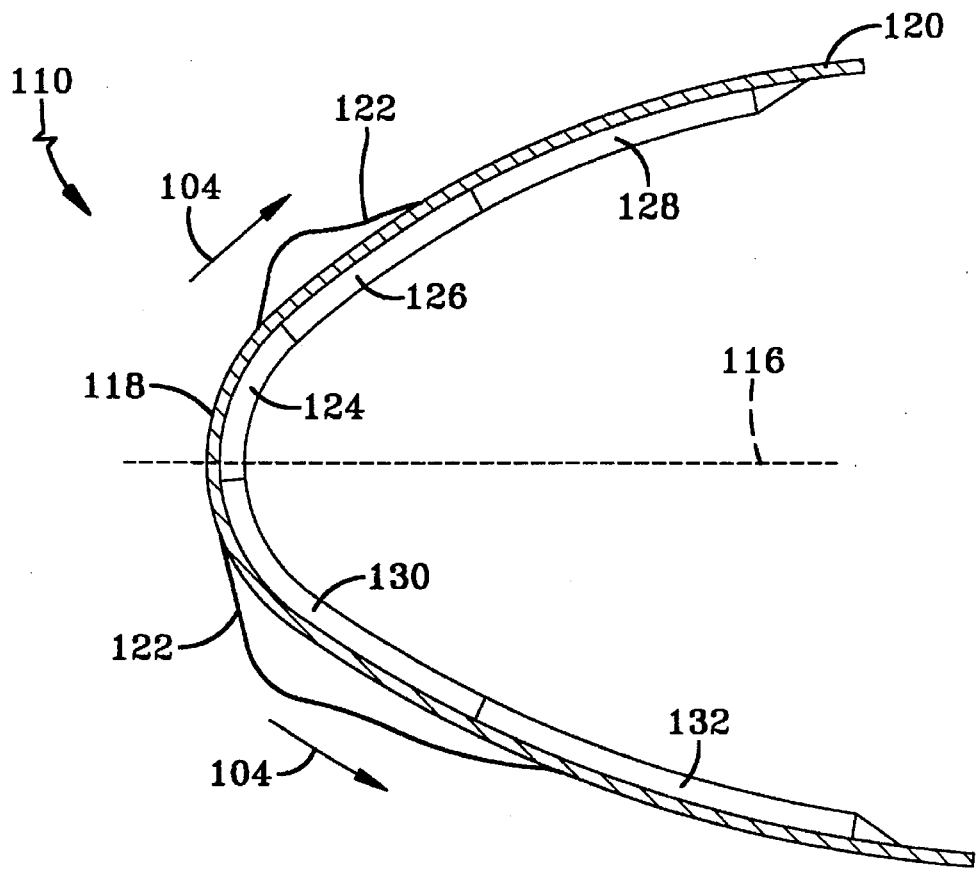
FIG. 5 is a cross sectional view of an electrothermal de-icer according to an aspect of the present invention mounted to an airfoil-shaped structural member.

Referring now to FIG. 5, a cross-sectional view is presented of an electrothermal de-icer 110 to be used with a controller 20 and control lines 24 and 26 as presented in FIG. 1, according to an aspect of the invention. In this example, the electrothermal de-icer is constructed similar to de-icer 60 of FIG. 4. Still referring to FIG. 5, structural member 120 defines the outer surface of an airfoil having an apex 118, and ice 122 accumulates upon the outer surface during flight in atmospheric icing conditions. A parting strip is disposed beneath skin 120 near the apex 118 of the airfoil. The parting strip heating element 124 continuously maintains the exposed surface of the de-icer 110 above freezing (when the system is activated in icing conditions). An upper primary heating element 126 is disposed adjacent parting strip 124 on the upper side of the airfoil centerline 116. An upper secondary heating element 128 is disposed adjacent element 126. A lower primary heating element 130 is disposed adjacent parting strip 124 on the lower side of the airfoil centerline 116. A lower secondary heating element 132 is disposed adjacent element 130. Heating elements 126, 128, 130, 132 make up shedding zones which are intermittently activated in accordance with an activation scheme described in greater detail hereinafter. An airstream impinges on the aircraft structure during flight and passes over the structure in a direction from fore to aft (in the chordwise direction), as indicated by arrows 104. The parting strip heating element is designed to run wet during icing conditions, which causes the ice cap 122 to split into an upper and lower ice cap, as shown in FIG. 5.

Figure 6:
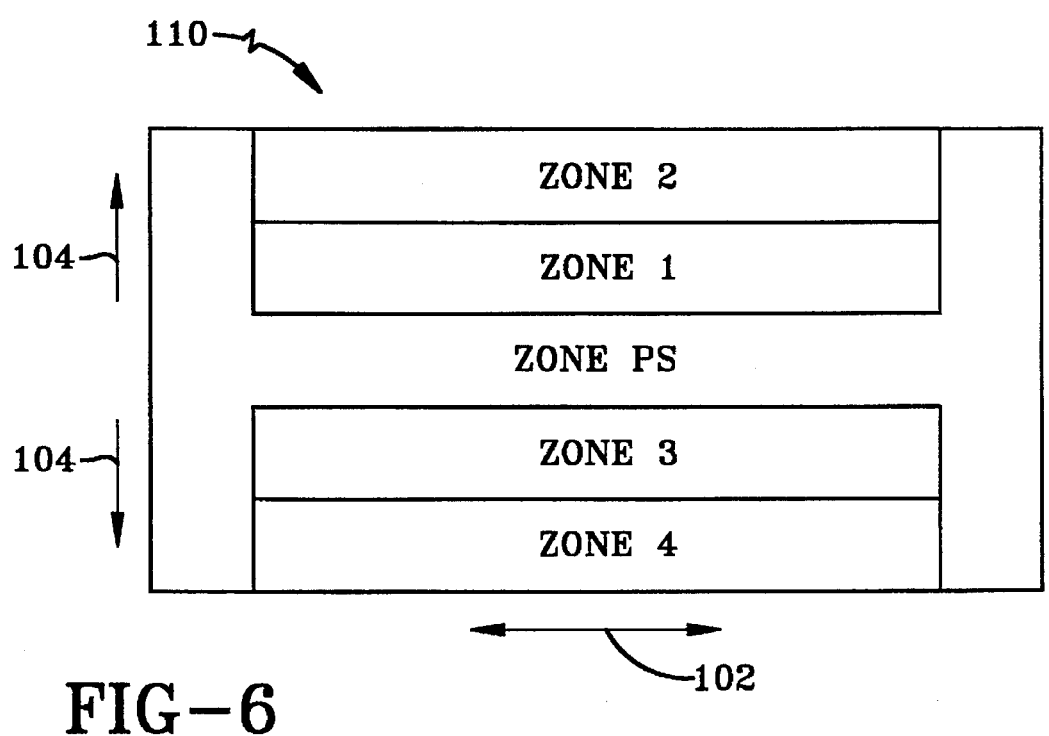
FIG. 6 is a plan view of an electrothermal de-icer having a parting strip and a plurality of deicing zones in accordance with the electrothermal de-icer illustrated in FIG. 5.

Referring now to FIG. 6, a plan view is presented of de-icer 110 of FIG. 5. Primary heating element defines ZONE 1, secondary heating element 128 defines ZONE 2, primary heating element 130 defines ZONE 3, and secondary heating element 132 defines ZONE 4. Each ZONE 1–4 is a shedding zone in which ice is allowed to accumulate, and then subsequently removed by applying electrical power to the corresponding heating element. ZONE 1 and ZONE 3 are referred to herein as "primary shedding zones," and ZONE 2 and ZONE 4 are referred to herein as "secondary shedding zones." The secondary shedding zones are immediately aft of the primary shedding zones. The parting strip zone (and elements) may be disposed immediately fore of a primary shedding zones (and elements). According to a preferred embodiment, the parting zone is disposed between two primary shedding zones. Each shedding zone is generally aligned with the spanwise direction 102 of the structural member, and the area of each zone is defined by the area over which each heating element is distributed, as shown in FIG. 2. Still referring to FIG. 6, the two primary shedding zones, ZONE 1 and ZONE 3 are bisected by a parting strip designated as ZONE PS. The parting strip zone has a strip that is generally aligned with the spanwise direction 102 interconnecting two chordwise strips generally aligned with the chordwise direction 104. The chordwise direction 102 is the direction in which an impinging airstream passes around the de-icer 110 and structural member 120. The spanwise direction 102 is generally perpendicular to the chordwise direction 104. The area of ZONE PS is defined by the area over which the parting strip heating element is distributed. According to a preferred embodiment, the ZONE PS is located in the stagnation region and extends in a spanwise direction 102 of the airfoil, and has a width sufficient to lie beneath the stagnation line in all critical flight conditions. The secondary zones are located immediately aft of the primary zones in a chordwise direction 104. Secondary zones cover both the predicted water droplet or ice particle impingement area and some areas where runback ice is expected. The primary and secondary zones are cycled and have power densities determined such that the over all shed cycle will maintain ice thicknesses within an airfoil design criteria. The controller cyclically heats the various zones by cyclically energizing and de-energizing the heating elements disposed beneath the zones. Heating stops when the element is de-energized. A heating element is energized by applying an electrical potential across the heating element, and de-energized by removing the electrical potential.

Figure 7:
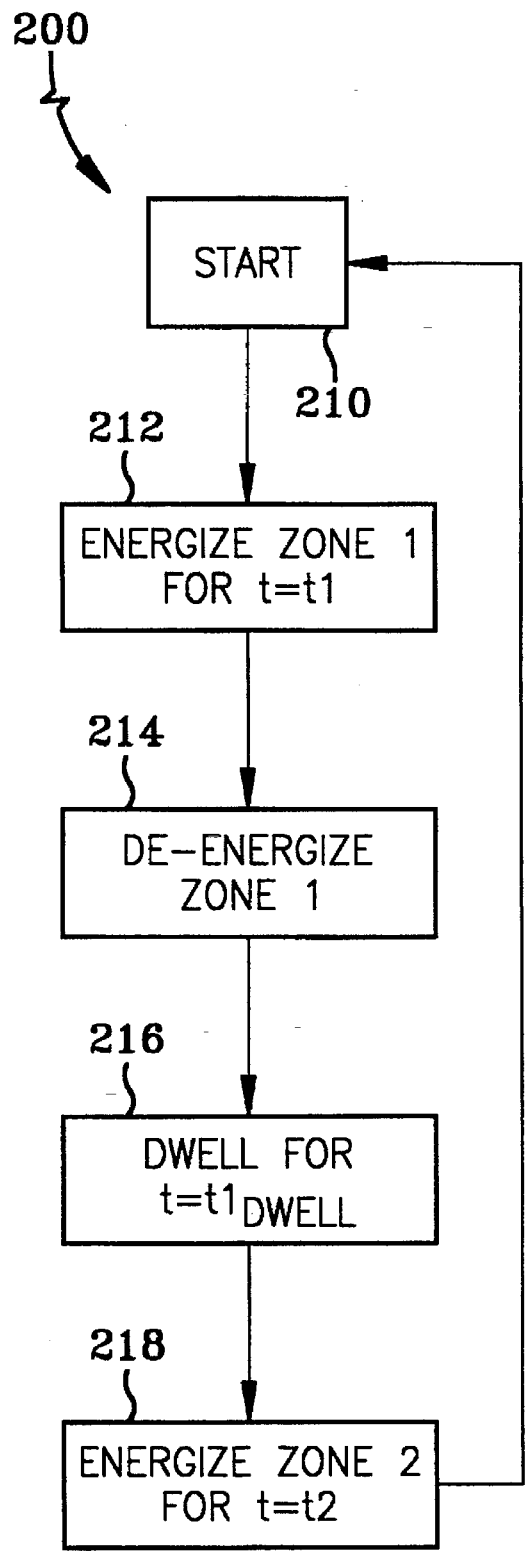
FIG. 7 is a simplified logic flow diagram illustrative of a routine for controlling an electrothermal de-icing system according to a first aspect of the present invention.

Referring now to FIG. 7, a simplified logic flow diagram illustrates a first routine for controlling (by controller 20 illustrated in FIG. 1) an electrothermal de-icing system 200 in accordance with the present invention. The sequence begins with the pilot activating the de-icing system at step 210. The sequence proceeds to step 212 wherein the heating element beneath ZONE 1 is energized for a period time t1 sufficient to induce ice shedding over ZONE 1. The sequence then proceeds to step 214 wherein the heating element beneath ZONE 1 is de-energized, followed by a dwell period, t1$_{dwell}$, in step 216. The sequence concludes with step 218 wherein the heating element beneath ZONE 2 is energized for a period of time t2 sufficient to induce ice shedding over ZONE 2, and the sequence may then be repeated if the aircraft is still flying in icing conditions.

Including the dwell time, t1$_{dwell}$ in the cycle is an important feature of the invention. The surface temperature of the de-icer over ZONE 1 remains above freezing for a period of time after ice sheds over ZONE 1. Water droplets continue to impinge upon ZONE 1 during this period of time, which forms rivulets of water on the surface of the de-icer that are blown aft (downstream) into ZONE 2. This condition is commonly referred to as "running wet" in ZONE 1, and "run-back" in ZONE 2. If ZONE 2 is energized immediately following ZONE 1, the rivulets of water from ZONE 1 continue to flow past ZONE 2 into an unheated area aft of ZONE 2 where it tends to refreeze. This condition is undesireable for many applications because the runback ice cannot be removed over an unheated area, which may be unacceptable for some airfoils in many flight conditions. The dwell time provides a period of time for the surface temperature of the de-icer over ZONE 1 to fall below freezing before energizing ZONE 2. Runback from ZONE 1 stops when ice begins to form in ZONE 1. According to a preferred embodiment, $t1_{dwell}$, is only slightly longer than the time necessary for ice to begin to form over ZONE 1 after ZONE 1 is de-energized, and thus Zone 2 is energized after Zone 1 cools to slightly below freezing. Therefore, according to an aspect of the invention, runback from ZONE 1 flows into ZONE 2 only during $t1_{dwell}$ while ZONE 2 is unheated, resulting in refreeze of the runback water over ZONE 2. ZONE 2 is subsequently energized while ZONE 1 is below freezing, which causes the runback ice to shed. Without the dwell time, the runback water flows over and past ZONE 2 to an unheated area, and cannot be removed. The dwell period is determined by analysis and/or experiment, with testing in an icing wind tunnel being preferred. The widths of ZONE 1 and ZONE 2 may be adjusted to facilitate this process. For example, the width of ZONE 2 may approximate the distance it takes the runback water from ZONE 1 to refreeze as it is blown along the surface of the de-icer. The appropriate widths of the zones may also be determined by analysis and/or experiment.

The volume of runback into aft zones is exacerbated by the presence of a parting strip. Referring again to FIG. 6, water droplets impinging on ZONE PS form rivulets that are blown into ZONE 1 and refreeze when ZONE 1 is unheated. An ice cap in ZONE 1 blocks runback generated by the parting strip from flowing into ZONE 2. However, when ZONE 1 is heated above freezing and the ice cap is shed, the water droplets flow past ZONE 1 into ZONE 2. Without a dwell between ZONE 1 and ZONE 2, the runback from ZONE PS, ZONE 1, and ZONE 2 would flow back to an aft unheated area and refreeze where it could not be removed.

Figure 8:
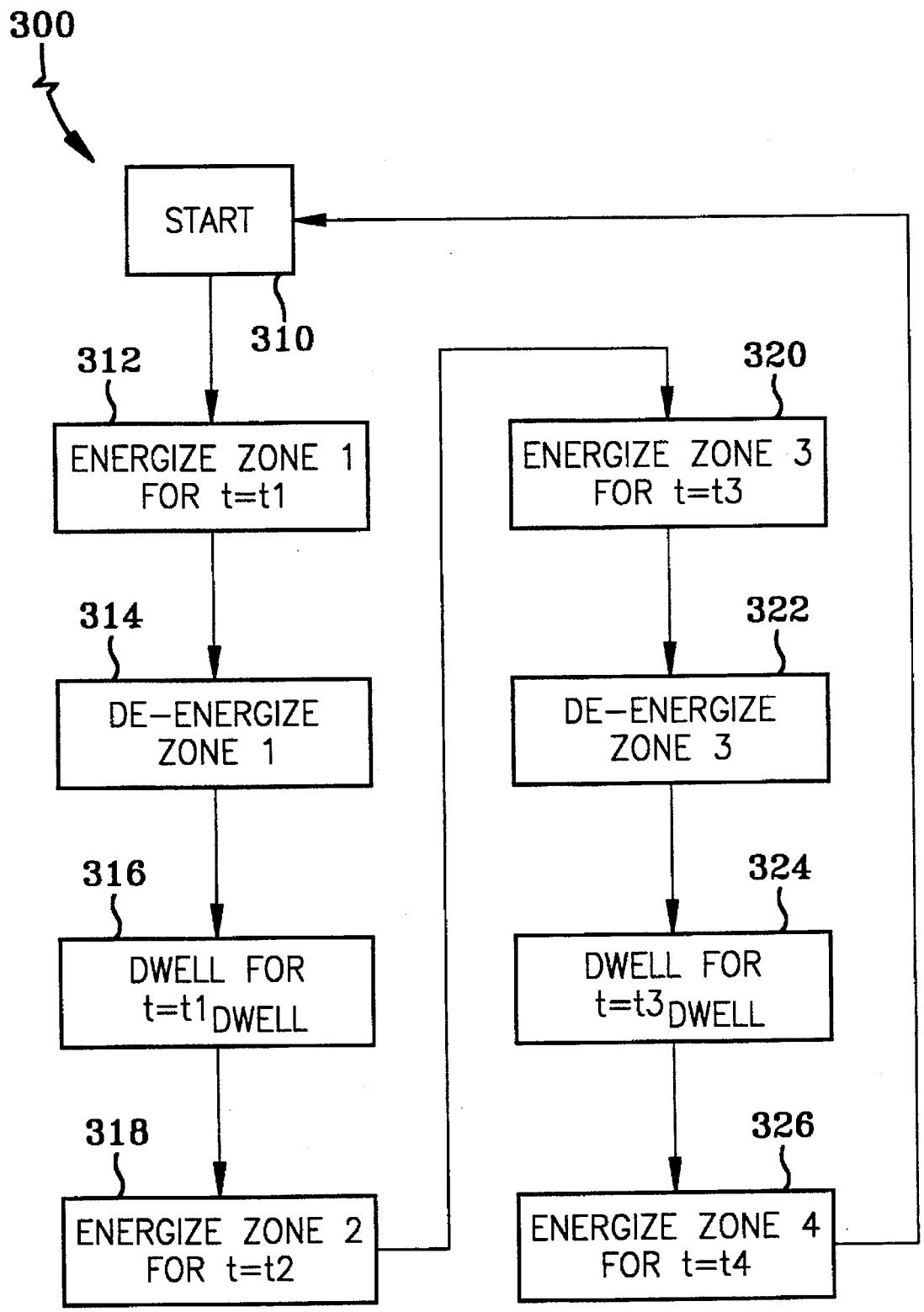
FIG. 8 is a simplified logic flow diagram illustrative of a routine for controlling an electrothermal de-icing system according to a second aspect of the present invention.

Referring now to FIG. 8, a simplified logic flow diagram illustrates a second routine for controlling (by controller 20 illustrated in FIG. 1) an electrothermal de-icing system 300 in accordance with the present invention. The sequence begins with the pilot activating the de-icing system at step 310, followed by energizing the heating elements disposed beneath ZONE 1 and ZONE 2 in steps 312, 314, 316, and 318 as previously described with respect to steps 212, 214, 216 and 218 of FIG. 7. Still referring to FIG. 8, the sequence continues with step 320 wherein the heating element disposed beneath ZONE 3 is energized for a period of time, t3, sufficient to induce ice to shed over ZONE 3. The heating element beneath ZONE 3 is subsequently de-energized in step 322, followed by a dwell period in step 324, $t3_{dwell}$, which serves the same purpose as $t1_{dwell}$, as previously described in relation to FIG. 7. The sequence then proceeds to step 326 wherein the heating element disposed beneath ZONE 4 is energized for a period of time t4, which is sufficient to induce ice shedding over ZONE 4. The sequence may then be repeated if the aircraft is still flying in icing conditions.

Figure 9:
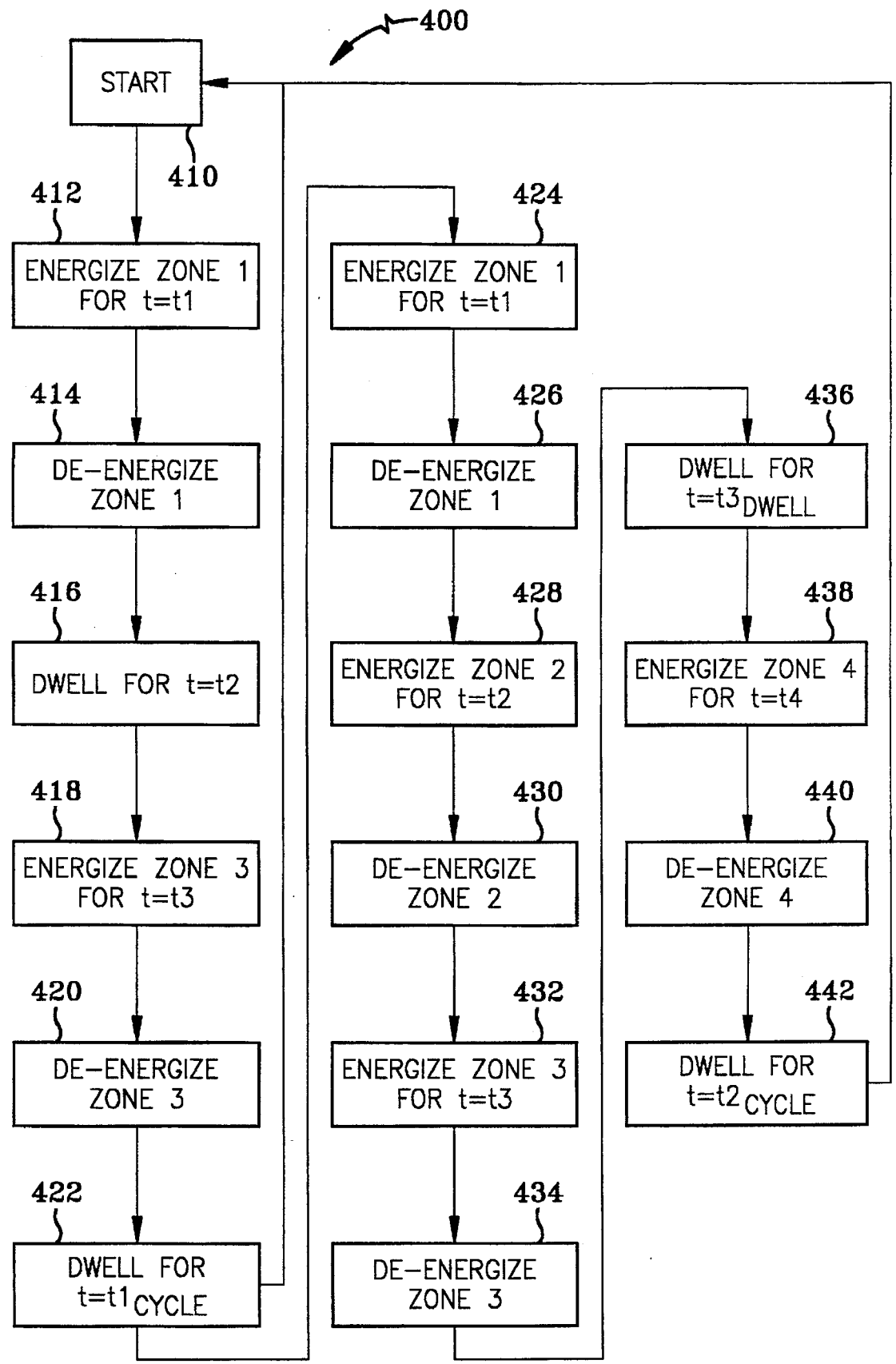
FIG. 9 is a simplified logic flow diagram illustrative of a routine for controlling an electrothermal deicing system according to a third aspect of the present invention.

In some applications, runback and refreeze may be allowed to accumulate over the secondary zone during a plurality of energization cycles of the primary zone before heating the secondary zone. Additionally, the dwell time may be omitted between two adjacent zones if runback over that surface of the de-icer is not critical. Referring now to FIG. 9, a simplified logic flow diagram illustrates a third routine for controlling (by controller 20 illustrated in FIG. 1) an electrothermal de-icing system 400 in accordance with the present invention. Assume the runback and refreeze over ZONE 1 and ZONE 2 is not critical in this application. The sequence begins with the pilot activating the de-icing system at step 410. The sequence then proceeds to step 412, wherein the heating element beneath ZONE 1 is energized for a period of time, t1, sufficient to induce ice shedding over ZONE 1, followed by step 414 wherein the heating element beneath ZONE 1 is de-energized. A dwell time for a period t2 follows in step 416, followed by energizing the heating element disposed beneath ZONE 3 in step 418 for a time sufficient to induce ice shedding over ZONE 3, and de-energizing ZONE 3 in step 420. A dwell time, $t1_{cycle}$, then follows step 422 during which ice is permitted to accumulate on the de-icer (except over the parting strip). Steps 412, 414, 416, 418, 420, and 422 may then be repeated a number of times before cycling ZONES 2 and 4. Ice tends to build faster over ZONES 1 and 3, which requires more frequent removal, and the ice build-up in these zones tends to block ice build-up from droplet impingement in ZONES 2 and 4.

After a plurality of cycles through steps 412, 414, 416, 418, 420, and 422, the sequence continues with step 424 wherein the heating element beneath ZONE 1 is again energized for the period of time t1, followed by de-energizing ZONE 1 in step 426. ZONE 2 is then immediately energized for the period of time t2 (no dwell) in step 428, followed by de-energizing ZONE 2 in step 428. The dwell between ZONE 1 and ZONE 2 is eliminated in this sequence since runback and refreeze is not critical (an assumption for this sequence). The sequence then proceeds with energizing ZONE 3 for the period of time, t3, in step 432, followed by de-energizing ZONE 3 in step 434. A dwell time for a period $t3_{dwell}$ then follows in step 436, $t3_{dwell}$ being sufficient to allow the de-icer surface temperature over ZONE 3 to fall below freezing in order to prevent runback past ZONE 4 (as previously described in relation to FIGS. 7 and 8). Steps 438 and 440 then follow wherein ZONE 4 is energized for a period, t4, sufficient to remove ice over ZONE 4, and subsequently de-energized. A final cycle dwell $t2_{cycle}$ may be provided at step 442, after which the whole cycle may be repeated as many times as is necessary.

As is evident from these examples, a variety of cycling sequences are possible that utilize a dwell time between adjacent chordwise shedding zones in order to minimize runback over at least one de-icing surface, any of which are considered to fall within the purview of invention. In addition, it is important to note that heating elements disposed beneath other areas of the de-icer surface may be energized during the various dwell times discussed above. Cycling may also alternate between de-icers disposed over symmetrical left and right aircraft components, such as the horizontal stabilizers 10 and 12 of FIG. 1. Finally, the times the various zones are energized, and the dwell times between adjacent zones, may be varied depending on outside air temperature and/or flight condition as necessary to achieve specific flight performance requirements, as specified by the airframe manufacturer. The dwell time between adjacent chordwise zones may even be eliminated in some outside air temperature and/or flight conditions if runback is not critical for those conditions. Such variations are considered on a case-by-case basis depending on specifications provided by the airframe manufacturer.

According to another aspect of the invention, ice may be shed over a fore de-icing zone during cycling of an adjacent aft de-icing zone. For example, referring again to FIG. 6, ice over ZONE 1 can be shed when ZONE 2 is energized, without energizing ZONE 1. Shedding over ZONE 1 is induced by chordwise heat transfer from ZONE 2. The time ZONE 2 is energized, t2, may be adjusted to achieve this purpose. This effect may be utilized to eliminate cycling of ZONE 1, which reduces total cycle time of the de-icer, and is particularly effective if ZONE 1 is disposed adjacent a parting strip. Chordwise heat transfer from ZONE PS tends to assist chordwise heat transfer from ZONE 2 in removing ice over ZONE 1. This effect is particularly useful with a metal surfaced de-icer, and is especially useful if an aluminum aircraft skin forms the exposed surface upon which ice accumulates.

According to yet another aspect of the invention, parting strip heating element temperature may be changed depending on outside air temperature in order to minimize runback. The purpose of the parting strip is to prevent ice formation in the vicinity of the stagnation line and split the ice cap into upper and lower pieces over the shedding zones. The amount of energy necessary to accomplish this purpose changes dramatically with outside air temperature. A parting strip designed to properly split the ice cap at $-22°$ F. can cause a large portion, or the entire de-icer, to run wet at warmer temperatures due to chordwise heat transfer. The amount of power generated by the parting strip element may be decreased as outside air temperature increases as necessary to confine the running wet to the parting strip, while maintaining the desired parting strip function. According to a preferred embodiment, the parting strip element is energized by applying an electrical potential across the element. The electrical potential has a constant average value, and is cyclically applied as necessary to maintain the parting strip element temperature between upper and lower setpoints. For example, temperature sensor 50 of FIG. 4 may provide feedback to controller 20 of FIG. 1. The controller 20 energizes the parting strip element if the element temperature is below a lower setpoint, and de-energizes the parting strip element if the element temperature is above an upper setpoint. In cold conditions, the element temperature may never exceed the upper setpoint, which results in power being constantly supplied to the parting strip heating element. As outside air temperature increases, the controller can automatically lower the parting strip temperature setpoints, which causes the power to cycle. An outside air temperature input to controller 20 may be provided for this purpose. Decreasing the temperature setpoints decreases the average power generated by the parting strip, and reduces chordwise heat transfer in the warmer conditions. Parting strip performance may thus maintained while minimizing chordwise heat transfer and runback at warmer conditions. Other variations may be applied to achieve this purpose. For example, an electrical potential could be constantly applied to the parting strip, and the magnitude of the potential could be decreased as outside air temperature increases in order to reduce the average power consumption of the parting strip element. Any such variations are considered to fall within the purview of the invention.

The controller 20 (FIG. 1), whose function is described hereinbefore, may be constructed in any of a number of ways well known in the art. For instance, the controller may be comprised of an on board computer which implements the heater cycling sequence utilizing a software program. The exemplary embodiments herein are described as being implemented within a program of a digital deicing control, the flowchart of which is illustrated in FIG. 7 hereinbefore. The particular characteristics of the deicing controller are irrelevant, so long as it is of the type that controls the electrical power application to the heater elements. Various types of suitable switches may be used, including mechanical switches, electromechanical switches, and solid-state switches. The invention may be implemented with dedicated digital or analog hardware if desired. In such a case, it may be implemented in a different fashion from that disclosed herein in accordance with the general equivalence between software as shown herein and dedicated digital hardware and software. Of course, the present invention may be implemented within a digital automatic flight control system computer. All of the foregoing is irrelevant to the invention, it suffices to select the aspects thereof which are desired to be utilized and to provide suitable signal processing to achieve the desired result in accordance with the invention, in a manner suited to the intended implementation or aircraft use.

Figure 10:
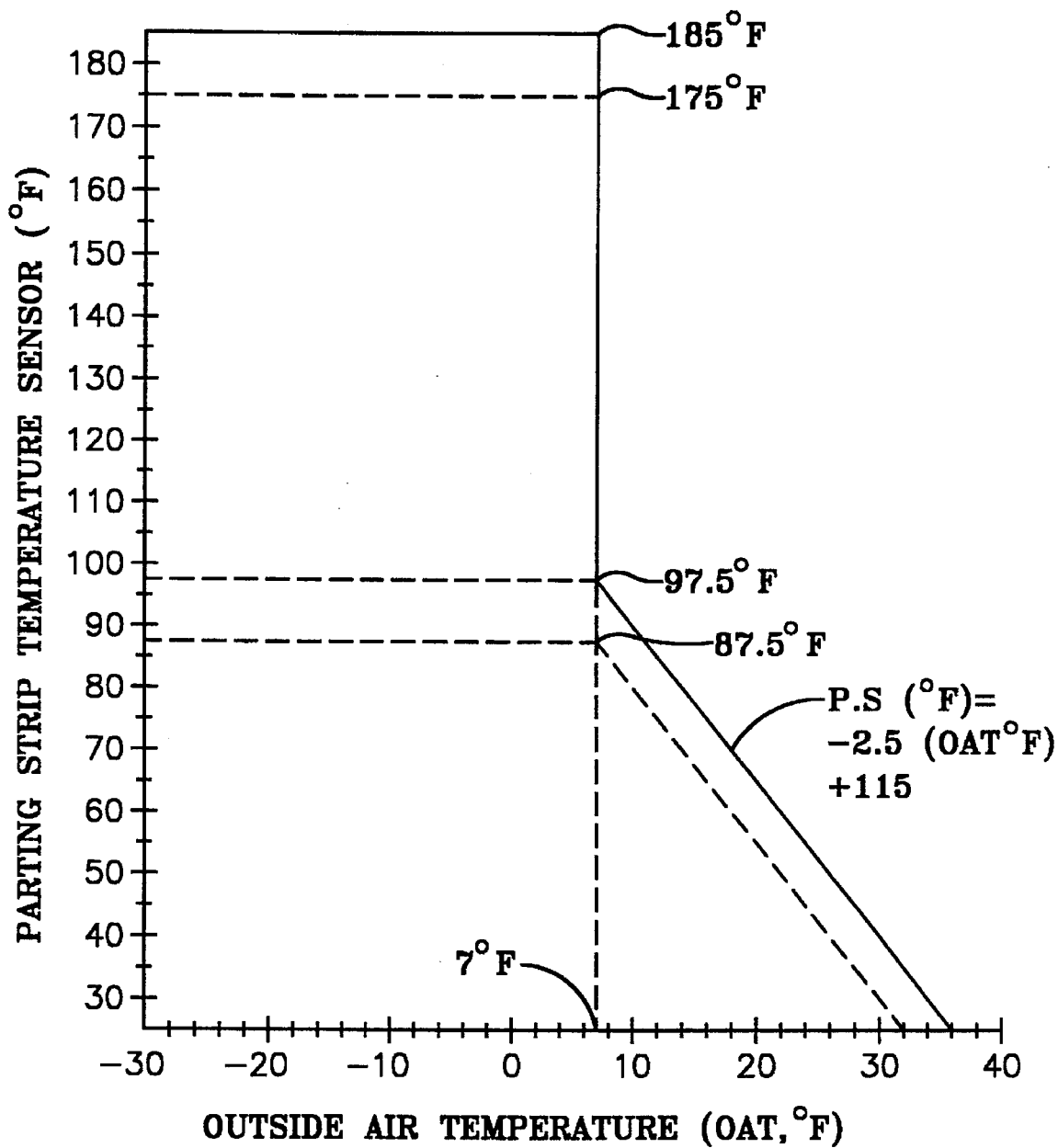
FIG. 10 is plot showing parting strip zone temperature setpoints versus outside air temperature.

The specific system configuration depends on the specific airframe manufacturer flight performance requirements, and the de-icer construction. A system according to the invention developed for the leading edges of the horizontal stabilizers on the Beechjet 400A was configured according to FIG. 6, with ZONE 1 and ZONE 2 on the upper surface. The spanwise parting strip, ZONE PS, was about 0.88 inches wide, ZONE 1 and ZONE 2 were about 1.28 inch wide, ZONE 3 and ZONE 4 were about 1.47 inch wide. Each shedding zone consumed 18 watts per square inch, and the parting strip consumed 24 watts per square inch (the electrical energy being converted to heat energy by resistive heating). The de-icer and structural member were configured according to FIG. 4, and were bonded together under heat and pressure to form a unitary structure. The inner insulating layer was about 0.025 inch thick epoxy fiberglass. The outer insulating layer was about 0.010 inch thick epoxy fiber glass. The structural member was a 0.050 inch thick aluminum leading edge skin. The skin formed the exposed surface to be de-iced, and also provided erosion protection for the de-icer. The heating elements were formed from pure copper using a photographic etching process, as is well known in the art. De-icers were provided for both the left and right stabilizers. Each parting strip was provided with two RTD temperature sensors, one being provided for redundancy. The controller cycled electrical power to the parting strip between temperature set points based on input from the temperature sensors. The setpoints varied with outside air temperature as presented on FIG. 10. A cycling sequence according to the invention was utilized at an outside air temperature of $2°$ F. or lower. The FIG. 9 sequence was utilized with the approximate time periods presented on Table 1 for operating the de-icer on one of the horizontal stabilizers. Steps 410, 412, 414, 416, 418, 420, and 422 were repeated twice for this cycle before continuing with step 424.

TABLE 1

| Time Period | Time (Secs.) |
| --- | --- |
| t1 | 8 |
| t2 | 8 |
| t1$_{cycle}$ | 96 |
| t3 | 20 |
| t3$_{dwell}$ | 16 |
| t4 | 14 |
| T2$_{cycle}$ | 66 |

The other horizontal stabilizer is cycled through the same sequence, but is phase shifted 66 seconds. The upper and lower temperature setpoints were $10°$ F. apart throughout the operating temperature range.

Although the invention has been shown and described with exemplary embodiments thereof, it should be understood by those skilled in the art that the foregoing and various other modifications, omissions and additions may be made therein and thereto without departing from the spirit and scope of the invention.

I claim:

1. A de-icing system including a de-icer attached to an aircraft structural member subjected to an impinging airstream during flight, said airstream passing over said structural member in a fore to aft direction, comprising:

a primary heater element disposed beneath a primary shedding zone upon which ice accumulates during flight said primary heater element being configured to heat said primary shedding zone upon application of an electrical potential across said primary heater element;

a secondary heater element disposed beneath a secondary shedding zone upon which ice accumulates during flight, said secondary heater element being configured to heat said secondary shedding zone upon application of an electrical potential across said secondary heater element, said secondary heater element being disposed immediately aft of said primary heater element; and, a controller configured to energize said primary heating element for a period of time sufficient to induce ice to shed from said primary shedding zone, to subsequently de-energize said primary heating element and allow said primary shedding zone to cool below freezing, and to subsequently energize said secondary heating element for a period of time sufficient to induce ice to shed from said secondary shedding zone while said primary shedding zone is below freezing.

2. The de-icing system of claim 1, further comprising a parting strip heater element disposed immediately fore of said primary heater element beneath a parting strip zone, said parting strip element being configured to heat said parting strip zone upon application of an electrical potential across said parting strip element; and, wherein said controller is configured to heat said parting strip heater element to maintain said parting strip zone above freezing during flight in icing conditions.

3. The de-icing system of claim 2, wherein said controller is configured to decrease an average electrical power consumed by said parting strip heater as outside air temperature increases.

4. The de-icing system of claim 2, further comprising a temperature sensor adjacent said parting strip heater element, and said controller is configured to heat said parting strip heater element if a temperature sensed by said temperature sensor is less than a lower setpoint, and to stop heating said parting strip heater element if said temperature sensed by said temperature sensor is greater than an upper setpoint, said controller being configured to decrease said lower and upper setpoints as outside air temperature decreases.

5. The de-icing system of claim 1, wherein said controller is configured to subsequently heat said secondary shedding zone after said primary shedding zone cools to slightly below freezing.

6. The de-icing system of claim 1, comprising a plurality of primary heater elements and a plurality of secondary heater elements, each primary heater element having a secondary zone disposed immediately aft of that primary heating element.

7. The de-icing system of claim 1, comprising a plurality of primary heater elements and a plurality of secondary heater elements, each primary heater element having a secondary zone disposed immediately aft of that primary heating element; and, wherein said structural member is an airfoil having a convex leading edge, at least one of said primary elements being disposed on either side of said leading edge.

8. The de-icing system of claim 7, further comprising a parting strip heater element disposed between said primary heater element disposed on either side of said convex leading edge beneath a parting strip zone, said parting strip element being configured to heat said parting strip zone upon application of an electrical potential across said parting strip element; and, wherein said controller is configured to heat said parting strip heater element and maintain said parting strip zone above freezing during flight in icing conditions.

9. The de-icer of claim 1, wherein said controller is configured to heat said secondary heater element for a period of time sufficient for heat to flow into said primary zone thereby inducing ice to shed from said primary shedding zone without heating said primary heater element during at least one cycle.

10. The de-icer of claim 2, wherein said controller is configured to heat said secondary heater element for a period of time sufficient for heat to flow into said primary zone thereby inducing ice to shed from said primary shedding zone without heating said primary heater element during at least one cycle.

11. A method for de-icing an aircraft structural member subjected to an impinging airstream during flight, said airstream passing over said structural member in a fore to aft direction, comprising the steps of:

energizing a primary heating element disposed beneath a primary shedding zone upon which ice accumulates during flight, said primary heating element being energized for a period of time sufficient to induce ice to shed from said primary shedding zone by applying an electrical potential across said primary heater element;

subsequently de-energizing said primary heating element and allowing said primary shedding zone to cool below freezing; and, subsequently energizing a secondary heating element disposed beneath a secondary shedding zone upon which ice accumulates during flight, said secondary heating element being energized for a period of time sufficient to induce ice to shed from said secondary shedding zone by applying an electrical potential across said secondary heating element while said primary shedding zone is below freezing, said secondary heating element being disposed immediately aft of said primary heater element.

12. The method of claim 11, further comprising a parting strip heater element disposed immediately fore of said primary heater element beneath a parting strip zone, said parting strip element being configured to heat said parting strip zone upon application of an electrical potential across said parting strip element; and, further comprising the step of heating said parting strip heater element to maintain said parting strip zone above freezing during flight in icing conditions.

13. The method of claim 12, further comprising the step of decreasing an average electrical power consumed by said parting strip heater as outside air temperature increases.

14. The method of claim 12, further comprising a temperature sensor adjacent said parting strip heater element, and further comprising the steps of heating said parting strip heater element if a temperature sensed by said temperature sensor is less than a lower setpoint, and stopping heating of said parting strip heater element if said temperature sensed by said temperature sensor is greater than an upper setpoint, and decreasing said lower and upper setpoints as outside air temperature decreases.

15. The method of claim 11, wherein said secondary shedding zone is heated after said primary shedding zone cools to slightly below freezing.

16. The method of claim 11, comprising the steps of heating a plurality of primary heater elements and heating a plurality of secondary heater elements, each primary heater element having a secondary zone disposed immediately aft of that primary heating element.

17. The method of claim 11, comprising the steps of heating a plurality of primary heater elements and heating a plurality of secondary heater elements, each primary heater element having a secondary zone disposed immediately aft of that primary heating element; and, wherein said structural member is an airfoil having a convex leading edge, at least one of said primary elements being disposed on either side of said leading edge.

18. The method of claim 17, further comprising a parting strip heater element disposed between said primary heater element disposed on either side of said convex leading edge beneath a parting strip zone, said parting strip element being configured to heat said parting strip zone upon application of an electrical potential across said parting strip element; and, further comprising the step of heating said parting strip heater element to maintain said parting strip zone above freezing during flight in icing conditions.

19. The de-icer of claim 11, further comprising the step of heating said secondary heater element for a period of time sufficient for heat to flow into said primary zone thereby inducing ice to shed from said primary shedding zone without heating said primary heater element during at least one cycle.

20. The de-icer of claim 12, further comprising the step of heating said secondary heater element for a period of time sufficient for heat to flow into said primary zone thereby inducing ice to shed from said primary shedding zone without heating said primary heater element during at least one cycle.

* * * * *